United States Patent
Brand et al.

(10) Patent No.: US 9,633,008 B1
(45) Date of Patent: Apr. 25, 2017

(54) COGNITIVE PRESENTATION ADVISOR

(71) Applicant: INTERNATIONAL BUSINESS MACHINES CORPORATION, Armonk, NY (US)

(72) Inventors: Samantha M. Brand, Hopewell Junction, NY (US); Eli M. Dow, Wappingers Falls, NY (US); Thomas D. Fitzsimmons, Poughkeepsie, NY (US)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 0 days.

(21) Appl. No.: 15/279,659

(22) Filed: Sep. 29, 2016

(51) Int. Cl.
*G06F 17/22* (2006.01)
*G06F 17/27* (2006.01)

(52) U.S. Cl.
CPC ...... *G06F 17/2785* (2013.01); *G06F 17/2264* (2013.01); *G06F 17/2705* (2013.01)

(58) Field of Classification Search
CPC ............. G06F 17/2264; G06F 17/2705; G06F 17/277; G06F 17/278; G06F 17/2785; G06F 17/3053
See application file for complete search history.

(56) References Cited

U.S. PATENT DOCUMENTS

| | | | |
|---|---|---|---|
| 5,917,480 A * | 6/1999 | Tafoya | G06T 1/00 715/732 |
| 6,819,338 B2 * | 11/2004 | Heasman | G06F 17/30017 704/8 |
| 7,050,978 B2 | 5/2006 | Silverstein et al. | |
| 7,246,316 B2 * | 7/2007 | Furlong | G06Q 10/10 715/251 |
| 7,263,530 B2 * | 8/2007 | Hu | G06F 17/30719 |
| 7,624,093 B2 | 11/2009 | Fortuna, Jr. | |

(Continued)

OTHER PUBLICATIONS

Ashmita Shetty et al, "Auto Text Summarization with Categorization and Sentiment Analysis", International Journal of Computer Applications (0975-8887), vol. 130, No. 7, 2015, pp. 57-60.

(Continued)

*Primary Examiner* — Maikhanh Nguyen
(74) *Attorney, Agent, or Firm* — Cantor Colburn LLP; Steven Chiu

(57) ABSTRACT

A computer-implemented method for reviewing content of a presentation is provided. The method includes obtaining, using a processor system of a device, content of an electronic presentation, wherein the content is associated with a first slide of the presentation. The format of the content is determined wherein the content includes natural language content and non-natural language content and the non-natural language content is converted into natural language content using the processor system. The sentiment and tone of the natural language content is analyzed using the processor system. A textual summary is created. The sentiment, tone and textual summary of the natural language content of the slide of the presentation is evaluated and a summary of the natural language content of the slide is presented using a display based upon the evaluation of the sentiment, tone and textual summary.

17 Claims, 7 Drawing Sheets

(56) References Cited

U.S. PATENT DOCUMENTS

| | | | | |
|---|---|---|---|---|
| 7,707,502 | B2* | 4/2010 | Coulomb | G06F 17/241 |
| | | | | 715/730 |
| 8,527,262 | B2* | 9/2013 | Kambhatla | G06F 17/277 |
| | | | | 434/322 |
| 8,904,267 | B2* | 12/2014 | Mewherter | G06F 17/211 |
| | | | | 715/200 |
| 9,264,245 | B2 | 2/2016 | Pasquero et al. | |
| 2002/0191013 | A1* | 12/2002 | Abrams | G06F 9/543 |
| | | | | 715/730 |
| 2004/0071453 | A1* | 4/2004 | Valderas | G11B 27/105 |
| | | | | 386/333 |
| 2004/0225667 | A1* | 11/2004 | Hu | G06F 17/30719 |
| 2005/0091579 | A1* | 4/2005 | Mewherter | G06F 17/2264 |
| | | | | 715/230 |
| 2008/0040340 | A1 | 2/2008 | Varadarajan et al. | |
| 2008/0319735 | A1* | 12/2008 | Kambhatla | G06F 17/277 |
| | | | | 704/9 |
| 2015/0269145 | A1* | 9/2015 | Fink | G06F 17/2785 |
| | | | | 715/254 |
| 2015/0269153 | A1* | 9/2015 | Fink | G06F 17/2785 |
| | | | | 707/750 |
| 2016/0011729 | A1 | 1/2016 | Flores et al. | |
| 2016/0027442 | A1* | 1/2016 | Burton | G10L 15/26 |
| | | | | 704/235 |
| 2016/0189556 | A1* | 6/2016 | Clark | G06F 17/28 |
| | | | | 434/362 |

OTHER PUBLICATIONS

Tonecheck, "Outlook" 2003/2007/2010, screen shot, p. 1.

* cited by examiner

COGNITIVE PRESENTATION ADVISOR

BACKGROUND

Presentations are utilized to convey a message from the presenter to the audience. Text and images are utilized in order to get the message across. A system and method for assisting the presenters in evaluating the effectiveness of their conveyance prior to the presentation would be beneficial.

SUMMARY

In accordance with one or more embodiments, a computer-implemented method for reviewing the content of a presentation is provided. The method includes obtaining, using a processor system of a device, content of an electronic presentation, wherein the content is associated with a first slide of the presentation. The format of the content is determined wherein the content includes natural language content and non-natural language content and the non-natural language content is converted into natural language content using the processor system. The sentiment and tone of the natural language content are analyzed using the processor system. A textual summary is created. The sentiment, tone and textual summary of the natural language content of the slide of the presentation are evaluated and a summary of the natural language content of the slide is presented using a display based upon the evaluation of the sentiment, tone, and textual summary.

In accordance with one or more embodiments, a system for reviewing the content of an electronic presentation having multiple slides is provided. The system includes a processor system and a cognitive presentation advisor. The cognitive presentation advisor includes an input module which accesses the content of the electronic presentation, wherein the content is associated with a slide of the presentation and a natural language module, which determines the format of the content contained on a first slide of the presentation wherein the content includes natural language content and non-natural language content. The natural language module converts non-natural language content into natural language content using the processor system. The cognitive presentation advisor also includes a sentiment analysis module which analyzes the sentiment of the natural language content and a tonal analysis module which analyzes the tone of the natural language content. Additionally, the cognitive presentation advisor also includes a word stemming and summation module creating a textual summary of the natural language content and an evaluation module evaluating the sentiment, tone and textual summary of the natural language content of the slides of the presentation.

In accordance with one or more embodiments, a computer program product for reviewing content of an electronic presentation having multiple slides is provided wherein the computer program product includes a computer readable storage medium having program instructions embodied therewith, wherein the computer readable storage medium is not a transitory signal per se, the program instructions being readable by a processing circuit to cause the processing circuit to perform a method which includes obtaining, using a processor system of a device, content of an electronic presentation, wherein the content is associated with a first slide of the presentation. The format of the content is determined wherein the content includes natural language content and non-natural language content and the non-natural language content is converted into natural language content using the processor system. The sentiment and tone of the natural language content are analyzed using the processor system. A textual summary is created. The sentiment, tone and textual summary of the natural language content of the slide of the presentation are evaluated and a summary of the natural language content of the slide is presented using a display based upon the evaluation of the sentiment, tone, and textual summary.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and methods for a cognitive presentation adviser for electronic presentations. Electronic presentations include multiple slides which are utilized to convey a message. Each slide is presented individually and discussed to an audience. These slides may include textual information in different fonts, colors, sizes, or special textual representations such as the use of a hashtag# followed by a reference, audio information such as audio files, visual images either as symbols or presented as moving images in a video, various background elements including color schemes or thematic schemes, or even interludes which provides for the introduction and presentation of the information in a stylized manner on the slide. The goal of the presentation of the information is to sufficiently convey the message to the audience. The invention analyzes the various components of the presentation slide to determine the overall impression that each slide presents to an audience and the overall impression of the presentation. The analysis includes the evaluation of the tone, semantics, and sentiments of the context as well as a summary of the words presented to provide an assessment to the user of the perception presented by the respective slide. Each slide of the presentation is evaluated individually. Additionally, each slide is assessed with respect to each other to assess the continuity of the presentation and provide feedback on what the overall message conveyed is and how it is received by an audience.

Recommendations are provided if improvements in tone, sentiment, or word summary may be obtained by modifying elements of the presentation.

Figure 1:
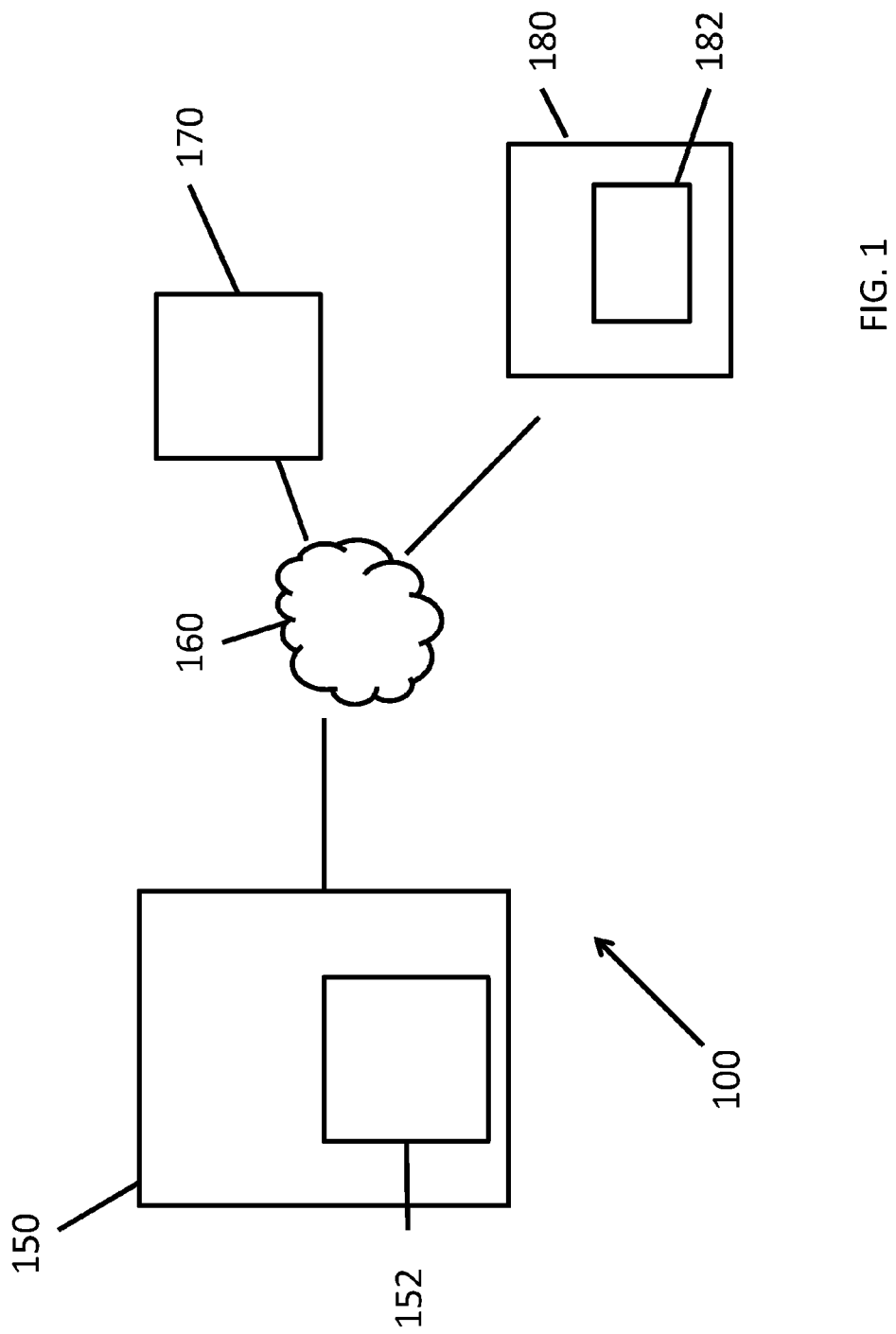
FIG. 1 illustrates a general overview of a system for evaluating the content of a presentation according to one or more embodiments.

Turning now to a more detailed description of the present disclosure, there is shown in FIG. 1, primary computer system 100 which may include a client device 150, a storage device 170 and a server computer 180 which are connected through a network 160. Client device 150 may be a workstation personal computer, personal digital assistant, mobile phone or other device capable of executing program instructions. A user interface 152 is located on client device 150 and may exist in the form of operating system software, which may be WINDOWS®, LINUX®, ANDROID®, or other systems that include application software such as internet applications and web browsers. In an embodiment, user interface 152 includes applications which utilize network 160 to access content on storage device 170 or server computer 180.

In an embodiment, primary computer system 100 includes network 160 which provides communication between devices such as but not limited to client device 150, storage device 170 and server computer 180. Network 160 may include connections such as wiring, wireless communications link, fiber optic cables, and other forms of communication. Network 160 may allow elements of primary computer system 100 to access content through a plurality of methods, including the internet, intranet connection, telecommunications service provider, local area connections and others.

Storage device 170 may represent any type of storage which is capable of storing data which may be accessed and utilized by client device 150 and server computer 180, including a database server, a hard drive on a computing device, flash memory, an external storage device, or other means of data storage. As depicted, storage device 170 is a networked storage device accessible via network 160. In an alternative embodiment, storage device 170 may be located on client device 150 as a component of client device 150. Additionally, storage device 170 may consist of separate storage devices 170 which store separate components.

A cognitive presentation advisor 182 is located on server computer 180 and can access and evaluate content located on storage device 170 responsive to a command from client device 150. Cognitive presentation advisor 182 may be located on the client device in the form of an application. In an embodiment, cognitive presentation advisor may retrieve presentation content stored on either client device 150 or storage device 170 while also possibly retrieving analytical modules stored on storage device 170. In an embodiment, cognitive presentation advisor 182 analyzes the content of electronic presentation materials to provide feedback to the end user regarding the conveyance of a particular message to an audience wherein the conveyance is evaluated with respect to tone, sentiment, impression, and context summary.

Figure 2:
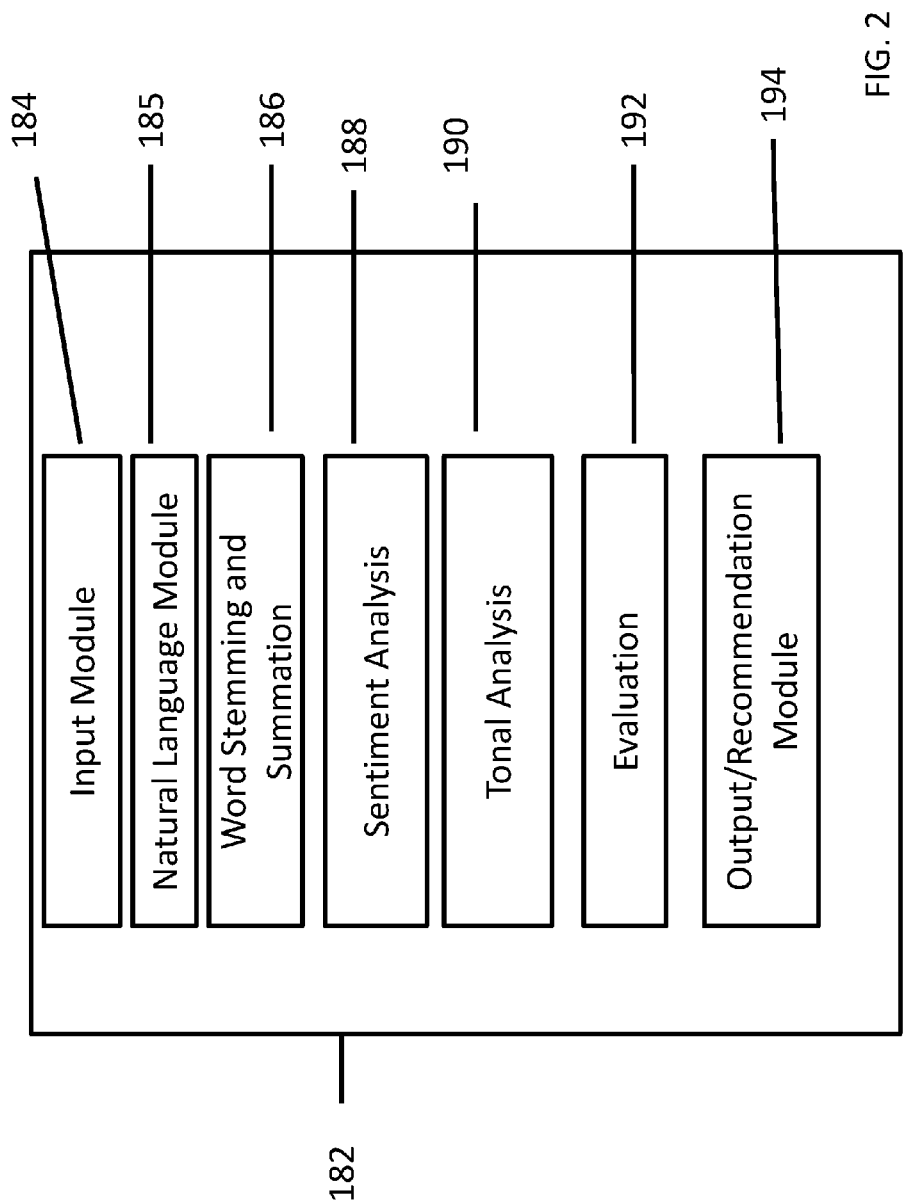
FIG. 2 illustrates a cognitive presentation advisor according to one or more embodiments.

As shown in FIG. 2, cognitive presentation advisor 182 includes a plurality of modules for evaluating an electronic presentation. Input module 184 receives the respective slides of the electronic presentation and parses the contextual information from the slides for review and analysis. Natural language module 185 retrieves natural language context contained within the respective slides of the electronic presentation. Additionally, natural language processing module 185 may translate non-natural language context into natural language. For instance, if audio files are associated with a respective slide, natural language processing module 185 may utilize a speech-to-text engine for deciphering the audio content into natural language. IBM® WATSON® natural language processing is a system capable of providing natural language processing functions. Also, if a visual image is associated with a respective slide, the visual image may be translated into natural language. Visual recognition allows a user to understand the contents of an image or video frame. IBM® WATSON® visual recognition application program interface is an example of a system which translates visual content to natural language. The visual recognition application program interface translates the contents of an image or video frame answering the question "what is in the image?". The visual recognition application interface may also identify the image or visual representation of the presentation background if one is utilized such as stripes or a color. Furthermore, the visual recognition application interface may also segment a video into a shorter video with preferred embodiments using a single resulting image which is evaluated as being from the most representative from of the video with the single resulting image being passed to nominal image routes for analysis. For instance, in many applications, a source video is represented by a series of extracted key frames wherein the time sampling of the video is also evaluated to determine if non-uniform sampling is present wherein certain images may be retained on a screen for a longer period of time indicating that such an image is of more importance as it is highlighted. Accordingly, the visual recognition application interface may identify images and also extract information relating to the presentation of the images which may be utilized in evaluating the tonal, or sentimental attributes of the images due to their presentation format. The natural language processing module may also interpret a hashtag expression. TWITTER® initiated the utilization of a linguistic expression of tagging a message with a hashtag followed by words. Such expressions are a shorthanded way of highlighting an idea or reference. Hashtag items typically provide an emphasis to a statement in a shorthanded manner. The natural language processing module may retain the association of the hashtag with the expression for further content processing.

Cognitive presentation advisor may also include a word stemming and summation module 186. Word stemming involves the process of reducing inflected or derived words to their root stem for evaluation. The summation is the process of reducing the content developed by the natural language module from the textual and visual images presented in the presentation in order to create a summary that retains the most important points of the original document. The summation module may utilize extraction or abstraction techniques. Extraction techniques function by selecting the words and phrases in the original text and form subsets of the existing words. Abstraction techniques function on creating a condensed semantic paraphrasing representation of the text that resembles human expression. Such techniques may be utilized more for visual imaging than textual content. The summation module may utilize ROUGE or Recall-Oriented Understudy for Gisting Evaluation for producing summaries. The summation module also performs document summation which analyzes the entire content of the presentation. The summation module may provide a summary for a singular slide or the entire presentation.

Cognitive presentation advisor 182 also may include a sentiment analysis module 188 for evaluating the sentiment quality of the presentation. The sentiment analysis module may be provided by IBM® WATSON® Alchemy application program interface. The Alchemy application program processes natural language to incorporate both a linguistic and statistical analysis in evaluating the context. In text analysis, sentiment is the attitude or opinion expressed toward something. Sentiment can be positive, "this is great", negative, "this smells badly", or neutral. The sentiment analysis module evaluates each slide in the presentation and may evaluate the presentation as a single document. Document level sentiment forms a sentiment analysis of the entire document which is analyzed as being positive, negative or mixed. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance a positive phrase such as "like" will have a predefined positive weight, whereas the phrase "love" will have a higher predefined positive weight. Additionally, negative weights may be afforded negative phrases such as "dislike" would have a predefined negative weight and the phrase "hate" would have a higher negative weight. The sentiment analysis module evaluates the content to provide a summary score. This score may also include an intensity value. Furthermore, the sentiment analysis module may include a hashtag interpreter affording more weight to those elements associated with a hashtag.

The cognitive presentation advisor may also include a tonal analysis module 190. The tonal analysis module may be IBM® WATSON® Tone analyzer service. The tonal analysis module may use linguistic analysis to detect three types of tones from the text. The natural language content is analyzed by the tonal analysis module for determining the emotional impact, social tone, and writing style that the content projects. This evaluation is conducted on an individual slide basis and on the overall presentation by reviewing the presentation as a single document.

The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value of point five to zero if that emotion is less likely to appear as perceived or alternatively to a higher value of point seventy-five to one if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value of point twenty-five or less indicating that it is more likely to be perceived as no-nonsense, straightforward, blunt and obvious, alternatively, a higher value of point seventy-five or more may be provided if the content indicates that it will be perceived as intellectual, curious, emotionally-aware, or imaginative. Conscientiousness is evaluated as the tendency to act in an organized or thoughtful way. This trait may be provided a value of point twenty-five or less if the presentation is perceived as spontaneous, laid-back, reckless, unmethodical or disorganized, or alternatively, a higher value of point seventy-five may be provided if the content is perceived as disciplined, dutiful, or confident. Extraversion is evaluated as the tendency to seek stimulation in the company of others. This trait may be provided a value of point twenty-five or less if perceived as independent, timid, introverted, restrained, boring, or alternatively, a higher value of point seventy-five or more may be provided if the content is perceived as engaging, seeking attention, assertive, sociable. Agreeableness is evaluated as the tendency to be compassionate and cooperative towards others. This trait may be provided a value of point twenty-five or less if the presentation is perceived as selfish, uncaring, uncooperative, confrontational or arrogant, or alternatively, a higher value of point seventy-five or more may be provided if the content is perceived as caring, sympathetic, cooperative, or trustworthy. The emotional range is evaluated as the tendency to be sensitive to the environment. This trait may be provided a value of point twenty-five or less if the presentation is perceived as calm, bland, content, relaxed or alternatively a higher value of point seventy-five or more may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value of point twenty-five or less if the text contains little or no evidence of analytical tone or alternatively a higher value of point seventy-five or above if the presentation is more likely to be perceived as intellectual, rational, systematic, emotionless, or impersonal. The confidence style may focus on the presenter's degree of certainty. The confidence style may be provided a value of point twenty-five or less if the text contains little or no evidence of confidence in tone or alternatively a higher value of point seventy-five or above if the style is more likely to be perceived as assured, collected, hopeful or egotistical. The tentative style may focus on the presenter's degree of inhibition. The tentative style may be provided a lower value of point twenty-five or less if the text contains little or no evidence of tentativeness in tone or a higher value of point seventy-five or above if the style is more likely to be perceived as questionable, doubtful limited, or debatable. The word stemming and summation module, sentiment analysis module and tonal analysis module may provide an analysis for a respective presentation slide and for the entire presentation.

As shown in FIG. 2, an evaluation module 192 may be utilized to aggregate the results from the word stemming and summation module 186, the sentiment analysis module 188, and the tonal analysis module 190. The evaluation module 192 may provide a recommendation for changes to the presentation to provide a more consistent message through word choices or inclusion or exclusion, sentiment, or tone. An output module 194 interacts with a display to provide the results of the analysis and potential recommendations.

Figure 3:
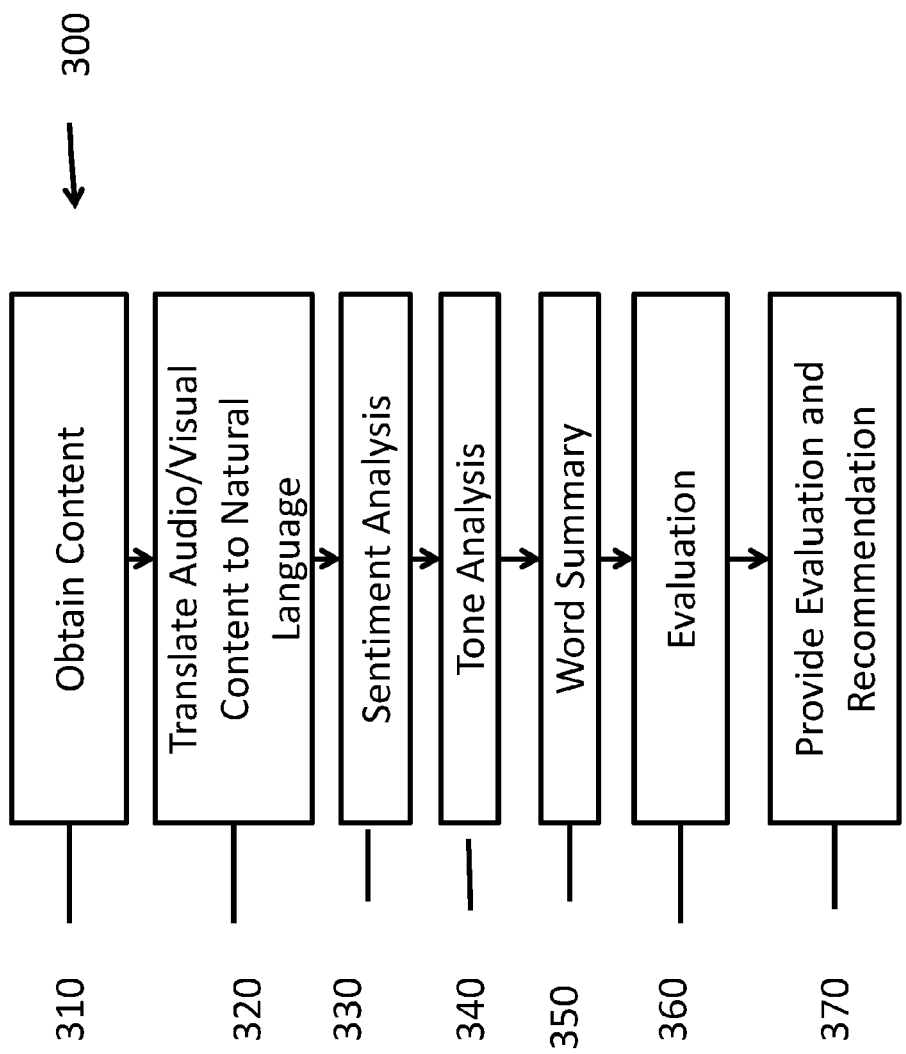
FIG. 3 illustrates a flow chart of a system for evaluating the content of a presentation according to one or more embodiments.

Referring now to FIG. 3, a flow diagram of a method 300 for evaluating an electronic presentation in accordance with some embodiments is shown. As shown at block 310, the content of a respective slide is obtained. The content may consist of natural and non-natural language. As shown at block 320, for non-natural language content such as audio and visual content, the non-natural language is translated to natural language content. At block 330, an analysis on the natural language sentiment is conducted by the sentiment analysis module which includes scoring the sentiment of a particular slide. At block 340, an analysis on the natural language tone is conducted by the tonal analysis module which includes scoring the tone of a particular slide. At block 350, word stemming and summation on the natural language is undertaken. At block 360, an evaluation of the analysis is rendered. The evaluation consists of providing the sentiment score, the tone score and the word summation utilizing a display.

In an embodiment, the evaluation of the slides of an electronic presentation is conducted in multiple subsets. A first subset includes evaluating each individual presentation slide to illustrate to the presenter the overall tone, sentiment and summary which the slide presents to an audience. In an additional embodiment, consisting of a second subset of slides, a first slide is compared with a second slide. For instance, at block 360, the evaluation of the sentiment aspect of the presentation may include the sentiment score of the first slide being compared with the sentiment score of the second slide. If the sentiment score of the first slide is greater than a relative difference, either a plus score or negative score, when compared to the second slide, the evaluation step at block 370 would indicate that the sentiment is not consistent between the slides and may possibly make a recommendation on modifying the content of one of the respective slides so the sentiment of the presentation as exhibited by the first and second slide is consistent. This scoring is also done for the document as a whole and the presentation sentiment score would be compared to the respective slide sentiment scores. Such analysis is also conducted by comparing a respective slides tonal score with slides in the presentation and the overall presentation tonal score.

In a further embodiment, the respective slides are iteratively evaluated at block 350 such that the tone, sentiment and word summary of the presentation as exhibited by the slides analyzed up to a point prior to an additional slide in the presentation being evaluated and are analyzed and provide a presentation tone score, presentation sentiment score, and a total word summary. The presentation tone score, presentation sentiment score are compared with the sentiment score and tone score of the respective slide to determine if the sentiment score and tone score of the respective slide are greater than a predetermined range from the presentation sentiment score and presentation tone score. A recommendation may be provided if the respective slide exhibits a sentiment or tone which does not meet the general sentiment or tone of the presentation up to that point.

For instance, if the presentation consists of eight slides, multiple iterations of the sentiment, tone, and word summary may be conducted. Initially, the sentiment, tone and word summary of a first slide would be analyzed to provide a sentiment score, a tonal score, and a word summary. The next process would consist of analyzing the second slide to provide a sentiment score, a tonal score, and a word summary. The respective scores and word summary of each slide would be compared to evaluate if one slide presented a different sentiment, tone, or message based on the word summary. If a discrepancy in sentiment or tone existed, then a recommendation may be provided to modify the content. Once the first and second slides have been evaluated, a presentation sentiment score and presentation tonal score is calculated based on the content of the first and second slides. In an embodiment, when the third slide is evaluated, the third slide will first have its respective sentiment score and tonal scored compared to those of the second slide to determine if a tonal or sentiment discrepancy exists between the two slides. Additionally, the sentiment score and tonal score of the third slide would be compared with the presentation sentiment score and tonal score to determine if a tonal or sentimental discrepancy existed between the third slide and the presentation as a whole as determined by the first and second slides. The iterative process continues until the eighth slide is evaluated. With the evaluation of the eighth slide, in this example, the presentation sentiment score and presentation tone score as well as the word summary would include the analysis each individual slide and the document as a whole including the content from the first to the last slide include in the analysis of the presentation sentiment score, presentation tonal score, and word summaries.

Figure 4:
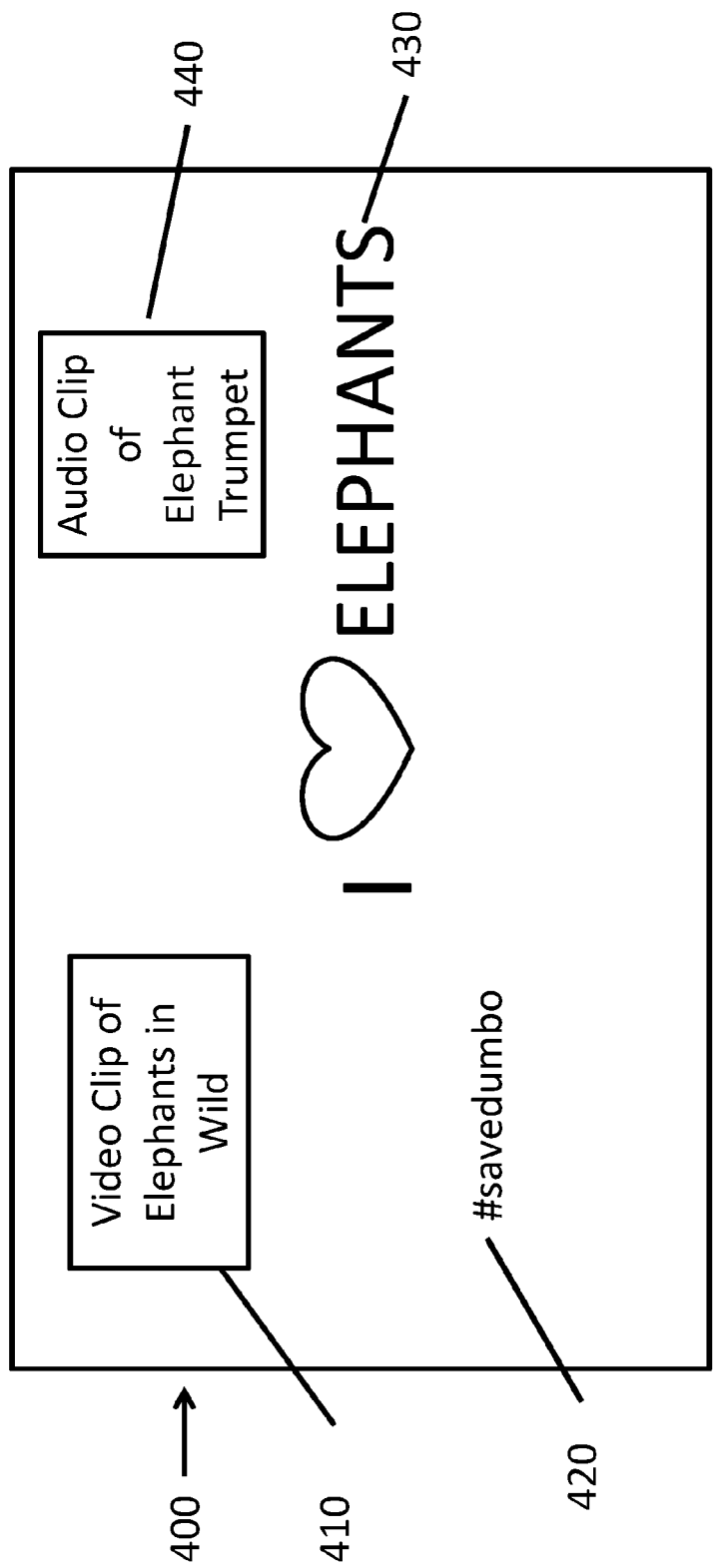
FIG. 4 illustrates a first slide of a presentation for evaluation by a cognitive presentation advisor according to one or more embodiments.

FIG. 4 illustrates an example of an embodiment of the invention. First slide 400 includes a video clip 410 of elephants in the wild. A hashtag expression 420 #savedumbo is presented in the text. An audio clip 440 of an elephant trumpet is presented. A statement, "I heart ELEPHANTS" is presented in text 430. Utilizing the method as shown in FIG. 3, the content of the first slide is obtained. The content includes both natural and non-natural language components. The video clip of elephants in the wild would be translated to natural language. The audio clip of the elephant trumpet would be translated into natural language. After the non-natural language is translated, a sentiment analysis of the natural language components is conducted. In the example, the video of the elephants in the wild may be analyzed to identify a pleasant happy scene with a positive sentiment score. Additionally, the translated audio component may be analyzed to identify a pleasing happy sound with a positive sentiment score. Additionally, the text "I heart ELEPHANTS" may be analyzed to identify that the utilization of a "heart" symbol in lieu of "like" or "love" represents a large positive sentiment in addition to the word "ELEPHANTS" being in all capital letters further evidences a large positive sentiment. With this analysis, a positive sentiment score is provided. In addition to the sentiment score, the tone of the slide is evaluated. The tonal analysis module may provide tonal scores for emotional tone, social tone, and language tone. The emotional tone of the first slide may be evaluated with a high emotional joy score and a low emotional fear, disgust or anger score. The social score may be high for openness, conscientiousness and organized. The language tone may be high for analytic, confidence and low for tentative. The word summary may identify "elephants" based on the audio and video clips relating to elephants, the phrase "ELEPHANT" and the reference to Dumbo the elephant.

Figure 5:
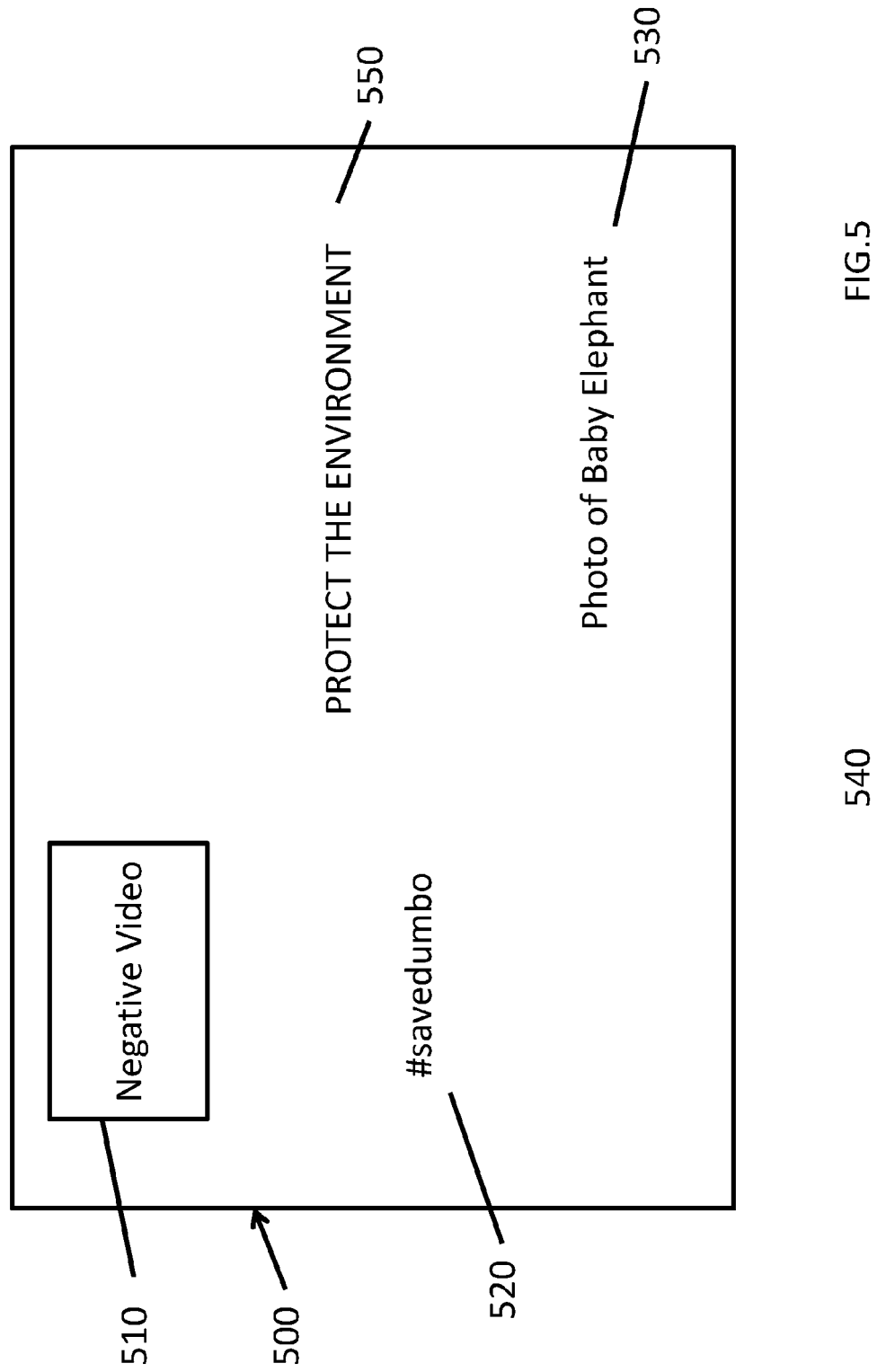
FIG. 5 illustrates a second slide of a presentation for evaluation by a cognitive presentation advisor according to one or more embodiments.

FIG. 5 illustrates a second slide 500 of the presentation. Slide 500 includes a video clip 510 which produces a negative image. A hashtag phrase #savedumbo 520 and a photo of a baby elephant 530 are provided. A phrase PROTECT THE ENVIRONMENT 550 is included. Utilizing the method as shown in FIG. 3, the content of the second slide is obtained. The content includes both natural and non-natural language components. The negative video clip would be translated to natural language. After the non-natural language is translated, a sentiment analysis of the natural language components is conducted. In the example, the negative video may be analyzed to identify a disturbing and unpleasant scene with a negative sentiment score. However, the photo of the baby elephant may provide a positive sentiment value. Additionally, the text "PROTECT THE ENVIRONMENT" being in all capital letters further evidences a large positive sentiment. With this analysis, a positive sentiment score is provided. The tonal analysis module may provide tonal scores for emotional tone, social tone, and language tone. The emotional tone of the second slide may be evaluated with a medium emotional joy score and a low emotional fear, disgust or anger score. The social score may be high for openness, conscientiousness and organized. The language tone may be high for analytic, confidence and low for tentative. The word summary may identify "elephants" based on the photograph and the reference to Dumbo the elephant.

Figure 6:
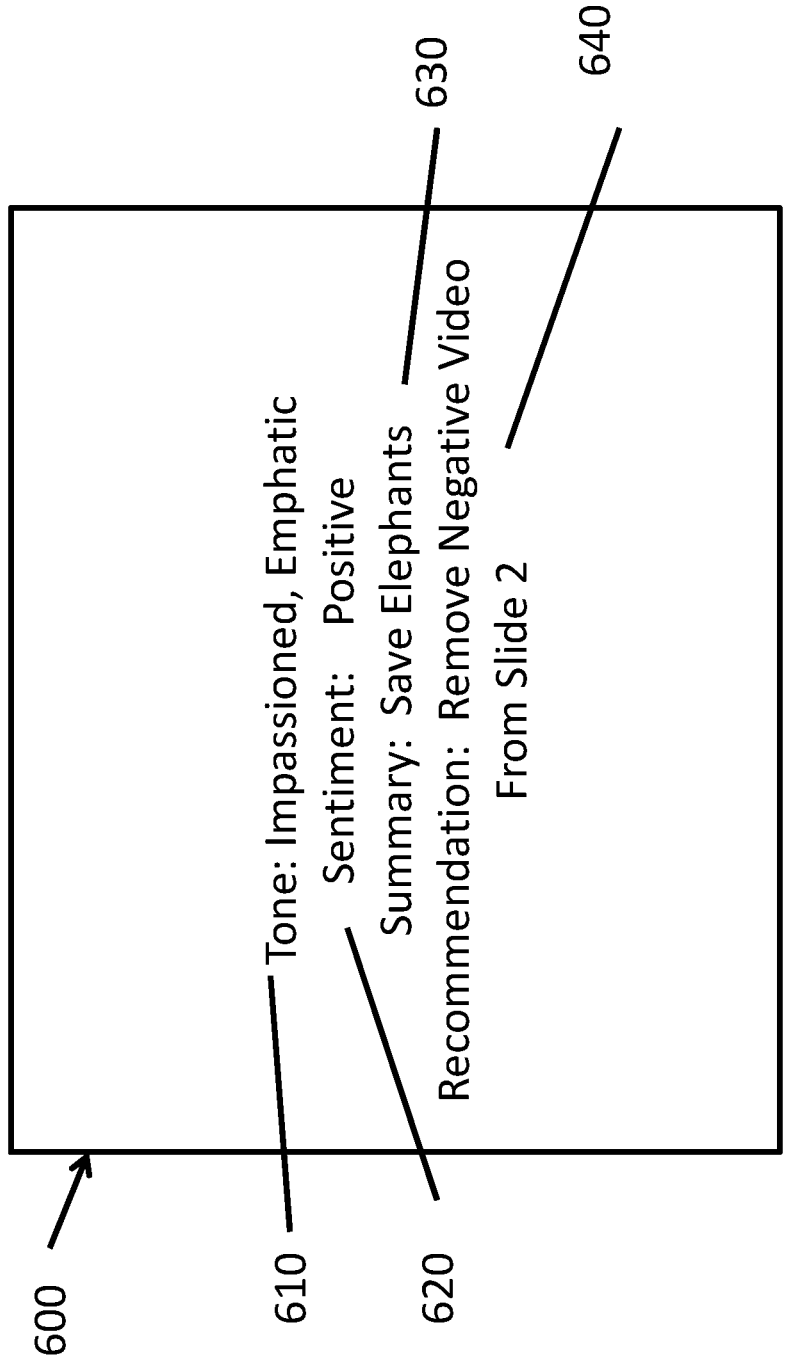
FIG. 6 illustrates an evaluation report according to one or more embodiments.

FIG. 6 illustrates a display providing a summary of the presentation as evidenced by analyzing the presentation as a whole and a recommendation. Summary 600 includes a tone summary 610, sentiment summary 620, a word summary 630 and a recommendation 640. Based on the utilization of strong words which are in capital letters, in addition to strong positive images and audio, the tone summary of the presentation may result in the tone of the presentation being evaluated as confident, and agreeable. The sentiment summary may be presented as positive. The word summary may be presented as "Save Elephants" based on the repeated references to elephants in the first and second slide and also the duplicative reference to "save" found in the hashtag component of both slides. The recommendation may be presented as removing the negative video component from slide two as the overall purpose of the second slide is to further strengthen the positive perception of elephants.

Figure 7:
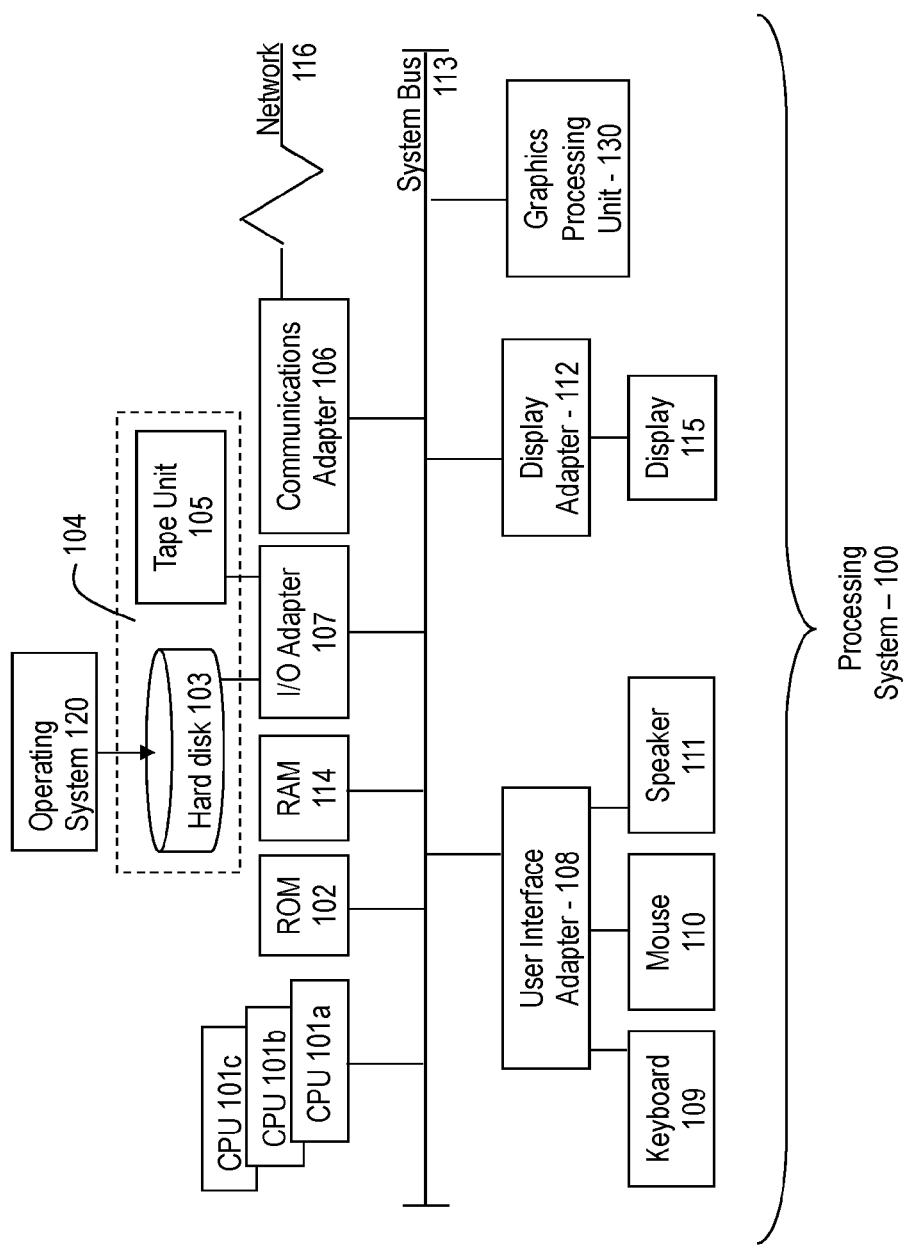
FIG. 7 shows a computer system according to an embodiment.

Referring to FIG. 7, there is shown primary computer system 100 according to one or more embodiments. Client device 150 may have the same configuration as primary computer system 100. The primary computer system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of primary computer system 100.

FIG. 7 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the primary computer system 100 may be stored in mass storage 104. A network adapter 106 interconnects bus 113 with an outside network 116 enabling primary computer system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 7, the primary computer system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for reviewing content of a presentation, the method comprising:
    obtaining, using a processor system of a device, content of an electronic presentation, wherein the content is associated with a first slide and a second slide of the presentation;
    determining, using the processor system, a format of the content contained on the first slide and the second slide of the presentation wherein the content includes natural language content and non-natural language content;
    converting non-natural language content into natural language content using the processor system;
    analyzing a sentiment of the natural language content using the processor system;
    analyzing a tone of the natural language content using the processor system;
    creating a textual summary of the natural language content using the processor system;
    evaluating the sentiment, tone and textual summary of the natural language content of the first slide and the second slide of the presentation;
    presenting a summary of the natural language content of the first slide and the second slide using a display based upon the evaluation of the sentiment, tone and textual summary.

2. The computer-implemented method of claim 1, wherein the presentation consists of a plurality of slides and the summary of the natural language content of each slide based upon the evaluation of the sentiment, tone and textual summary of each of the respective slides is compared to the remaining slides to determine an overall summary of the sentiment, tone and textual summary of the entire presentation.

3. The computer-implemented method of claim 2, wherein at least one of the sentiment, tone or textual summary of one of the slides of the presentation is compared to the sentiment of the one of the slides of the presentation, tone and textual summary of the entire presentation to determine if the sentiment, tone and textual summary of the respective slide is consistent with the sentiment, tone, and textual summary of the entire presentation.

4. The computer-implemented method of claim 3, wherein the sentiment of a respective slide is scored creating a slide sentiment score, wherein the sentiment of the entire presentation is scored creating a presentation sentiment score, and wherein the method includes recommending a change to the natural language content of the respective slide if the slide sentiment score is of a marginal difference greater than a predetermined value when compared to the presentation sentiment score.

5. The computer-implemented method of claim 3, wherein the tone of a respective slide is scored creating a slide tone score, wherein the tone of the entire presentation is scored creating a presentation tone score, and wherein the method includes recommending a change to the natural language content of the respective slide if the slide tone score is of a marginal difference greater than a predetermined value when compared to the presentation tone score.

6. The computer-implemented method of claim 1, wherein the sentiment of the first slide is scored creating a first slide sentiment score, and wherein the sentiment of the second slide is scored creating a second slide sentiment score, and wherein the method includes recommending a change to the natural language content of either the first or second slide if the first slide sentiment score is of a marginal difference greater than a predetermined value when compared to the second slide sentiment score.

7. The computer-implemented method of claim 1, wherein the tone of the first slide is scored creating a first slide tone score, and wherein the tone of the second slide is scored creating a second tone sentiment score, and wherein the method includes recommending a change to the natural language content of either the first or second slide if the first slide tone score is of a marginal difference greater than a predetermined value when compared to the second slide tone score.

8. The computer-implemented method of claim 1, wherein the first slide contains visual content and audio content, wherein the visual and audio content is translated to natural language.

9. A system for reviewing content of an electronic presentation having multiple slides, the system comprising:
a processor system;
a cognitive presentation advisor including:
an input module, using the processor system, accessing content of an electronic presentation, wherein the content is associated with a first slide and a second slide of the presentation;
a natural language module, using the processor system, determining a format of the content contained on a first slide and the second slide of the presentation wherein the content includes natural language content and non-natural language content, the natural language module converting non-natural language content into natural language content using the processor system;
a sentiment analysis module, using the processor system, analyzing the sentiment of the natural language content;
a tonal analysis module, using the processor system, analyzing the tone of the natural language content;
a word stemming and summation module, using the processor system, creating a textual summary of the natural language content; and
an evaluation module, using the processor system, evaluating the sentiment, tone and textual summary of the natural language content of the first and second slides of the presentation; and
a display displaying a summary of the natural language content of the first slide and the second slide based upon the evaluation of the sentiment, tone and textual summary.

10. The system of claim 9 wherein the sentiment analysis module analyzes the sentiment of a slide by evaluating the natural language content as being positive or negative.

11. The system of claim 9 wherein the evaluation module evaluates the sentiment, tone and textual summary of the natural language of each slide individually and the slides aggregately.

12. The system of claim 9 including a recommendation module, using the processor system, recommending modifications to the natural language content of a respective slide if the slide has a sentiment score the slides.

13. The system of claim 12 wherein the tone of a respective slide is scored creating a slide tone score, wherein the tone of the entire presentation is scored creating a presentation tone score, and wherein the recommendation module recommends a change to the natural language content of the respective slide if the slide tone score is of a marginal difference greater than a predetermined value when compared to the presentation tone score.

14. A computer program product for reviewing content of a presentation, the computer program product comprising a computer readable storage medium having program instructions embodied therewith the program instructions readable by a processing circuit to cause the processing circuit to perform a method comprising:
obtaining, using a processor system of a device, content of an electronic presentation, wherein the content is associated with a first slide and a second slide of the presentation;
determining, using the processor system, a format of the content contained on the first slide and the second slide of the presentation wherein the content includes natural language content and non-natural language content;
converting non-natural language content into natural language content using the processor system;
analyzing a sentiment of the natural language content using the processor system;
analyzing a tone of the natural language content using the processor system;
creating a textual summary of the natural language content using the processor system;
evaluating the sentiment, tone and textual summary of the natural language content of the first slide and the second slide of the presentation; and
presenting a summary of the natural language content of the first slide and the second slide using a display based upon the evaluation of the sentiment, tone and textual summary.

15. The computer program product of claim 14, wherein the presentation consists of a plurality of slides and the summary of the natural language content of each slide based upon the evaluation of the sentiment, tone and textual summary of each of the respective slides is compared to the remaining slides to determine an overall summary of the sentiment, tone and textual summary of the entire presentation.

16. The computer program product of claim 14, wherein at least one of the sentiment, tone or textual summary of one of the slides of the presentation is compared to the sentiment of the one of the slides of the presentation, tone and textual summary of the entire presentation to determine if the sentiment, tone and textual summary of the respective slide is consistent with the sentiment, tone, and textual summary of the entire presentation.

17. The computer program product of claim 14, wherein the tone of a respective slide is scored creating a slide tone score, wherein the tone of the entire presentation is scored creating a presentation tone score, and wherein the method includes recommending a change to the natural language content of the respective slide if the slide tone score is of a marginal difference greater than a predetermined value when compared to the presentation tone score.

* * * * *